US010300633B2

(12) United States Patent
Penazzi

(10) Patent No.: US 10,300,633 B2
(45) Date of Patent: May 28, 2019

(54) MALE MOULD ELEMENT

(71) Applicant: SACMI COOPERATIVA MECCANICI IMOLA SOCIETA' COOPERATIVA, Imola (Bologna) (IT)

(72) Inventor: Davide Penazzi, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 70 days.

(21) Appl. No.: 14/371,684

(22) PCT Filed: Mar. 20, 2013

(86) PCT No.: PCT/IB2013/052210
§ 371 (c)(1),
(2) Date: Jul. 10, 2014

(87) PCT Pub. No.: WO2013/140351
PCT Pub. Date: Sep. 26, 2013

(65) Prior Publication Data
US 2015/0044323 A1 Feb. 12, 2015

(30) Foreign Application Priority Data
Mar. 21, 2012 (IT) .............................. MO2012A0072

(51) Int. Cl.
B29C 33/04 (2006.01)
B29C 33/02 (2006.01)
(Continued)

(52) U.S. Cl.
CPC .............. B29C 33/02 (2013.01); B29C 33/04 (2013.01); B29C 45/7312 (2013.01);
(Continued)

(58) Field of Classification Search
CPC ........ B29C 45/7312; B29C 2045/7318; B29C 2045/7362; B29C 33/02; B29C 33/04; B29C 33/048
(Continued)

(56) References Cited

U.S. PATENT DOCUMENTS 3,740,180 A * 6/1973 Sidur .................. B29C 45/7312
425/451
5,599,567 A 2/1997 Gellert
(Continued)

FOREIGN PATENT DOCUMENTS

CN 1138623 1/2002
CN 1329538 A 1/2002
(Continued)

OTHER PUBLICATIONS

English Abstract for NODA (JP 59-164109) published on Sep. 17, 1984.*

Primary Examiner — Seyed Masoud Malekzadeh
(74) Attorney, Agent, or Firm — Pearne & Gordon LLP

(57) ABSTRACT

A male mold element includes a cooling circuit having first passage elements obtained in a first component of the male mold element and second passage elements obtained in a second component of the male mold element, the first passage elements and the second passage elements being distributed around a longitudinal axis of the male mold element so that there exist a plurality of angular positions of the first component relative to the second component in which the first passage elements are in fluid communication with the second passage elements.

21 Claims, 8 Drawing Sheets

(51) Int. Cl.
*B29C 45/73* (2006.01)
*B29L 31/56* (2006.01)
*B29K 105/00* (2006.01)

(52) U.S. Cl.
CPC .... *B29C 33/048* (2013.01); *B29C 2045/7318* (2013.01); *B29C 2045/7362* (2013.01); *B29K 2105/253* (2013.01); *B29L 2031/565* (2013.01)

(58) Field of Classification Search
USPC .................................................. 425/547, 552
See application file for complete search history.

(56) References Cited

U.S. PATENT DOCUMENTS

| | | | |
|---|---|---|---|
| 5,786,079 A | 7/1998 | Alieri | |
| 5,935,621 A * | 8/1999 | Gellert | B29C 45/7312 |
| | | | 425/549 |
| 6,079,972 A | 6/2000 | Gellert | |
| RE38,265 E * | 10/2003 | Gellert | B29C 45/7312 |
| | | | 425/549 |
| 7,607,633 B2 * | 10/2009 | Zeppenfeld | B29C 45/7312 |
| | | | 249/80 |
| 8,038,434 B2 | 10/2011 | Zuffa et al. | |
| 8,501,067 B2 | 8/2013 | Zuffa et al. | |
| 2008/0277820 A1 | 11/2008 | Zuffa et al. | |
| 2012/0007274 A1 | 1/2012 | Zuffa et al. | |

FOREIGN PATENT DOCUMENTS

| | | | | |
|---|---|---|---|---|
| CN | 201098979 Y | 8/2008 | | |
| CN | 101708644 A | 5/2010 | | |
| DE | 10022289 A1 | 11/2001 | | |
| GB | 1467465 | 3/1977 | | |
| JP | S52025816 | 9/1978 | | |
| JP | 59164109 A | * | 9/1984 | ......... B29C 45/7312 |
| JP | H09109191 A | 4/1997 | | |
| JP | 3755893 | 6/1997 | | |
| JP | H09505779 | 6/1997 | | |
| JP | H09262870 A | 10/1997 | | |
| JP | 2002531297 A | 9/2002 | | |
| JP | 2008543614 A | 12/2008 | | |
| JP | 2009506912 | 2/2009 | | |
| TW | 316869 | 10/1997 | | |
| WO | 0034026 A1 | 6/2000 | | |
| WO | 2006138096 | 12/2006 | | |
| WO | 2007028702 | 3/2007 | | |

* cited by examiner

Fig. 3
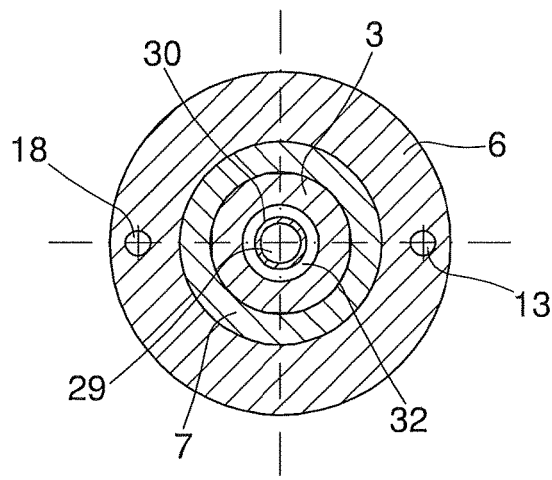
Fig. 4
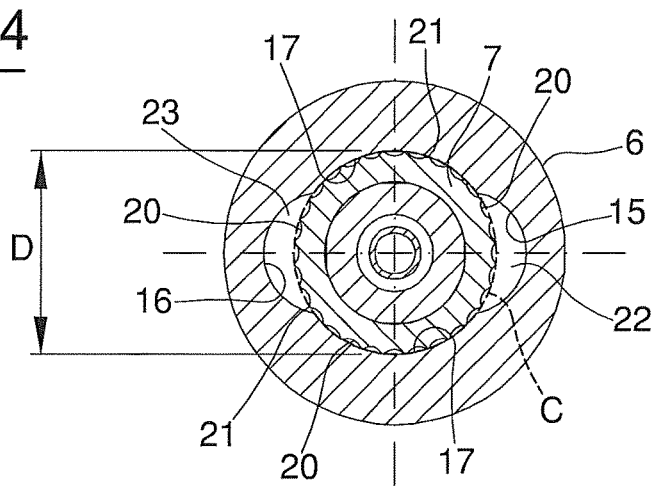
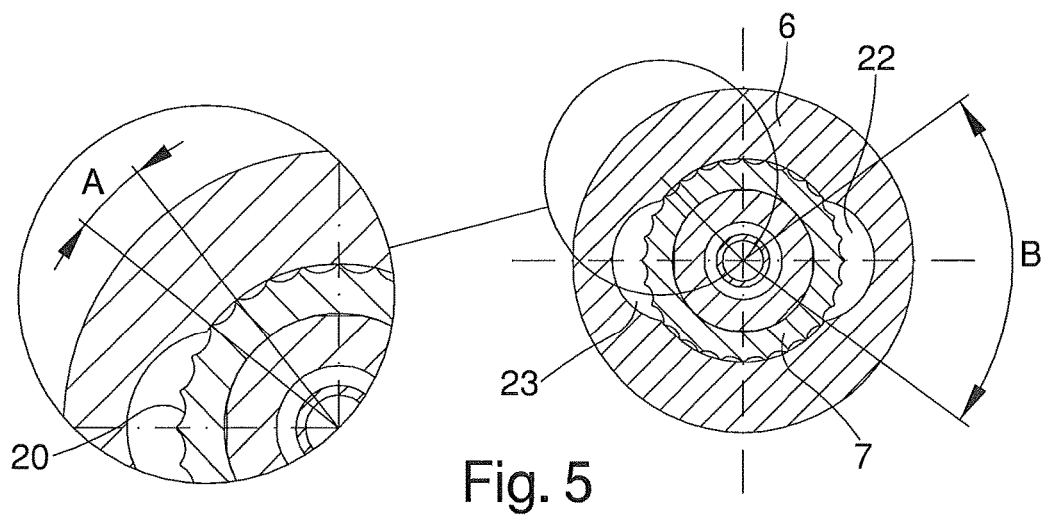
Fig. 5

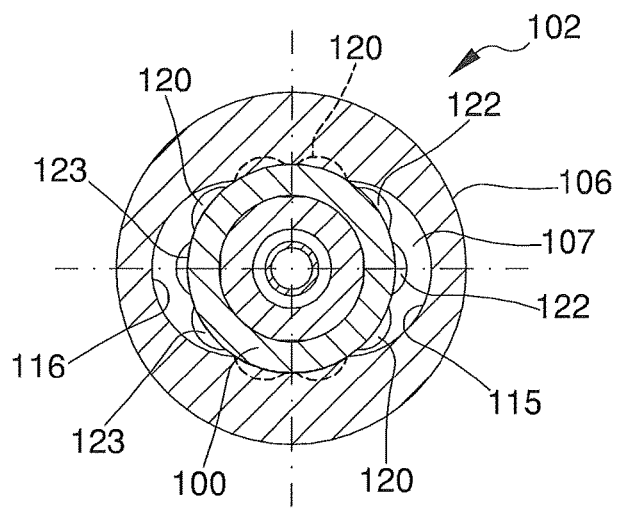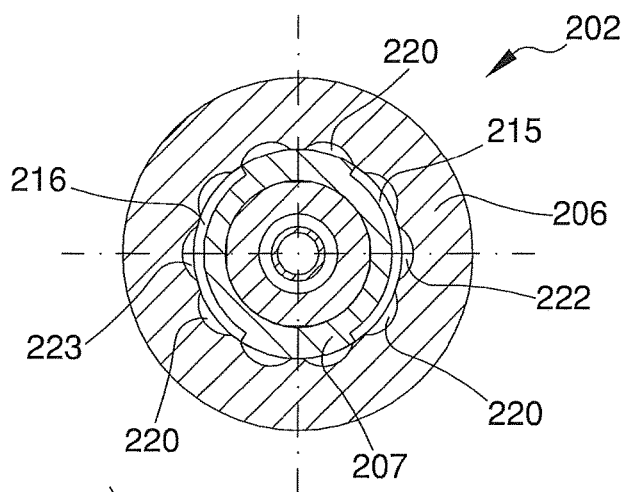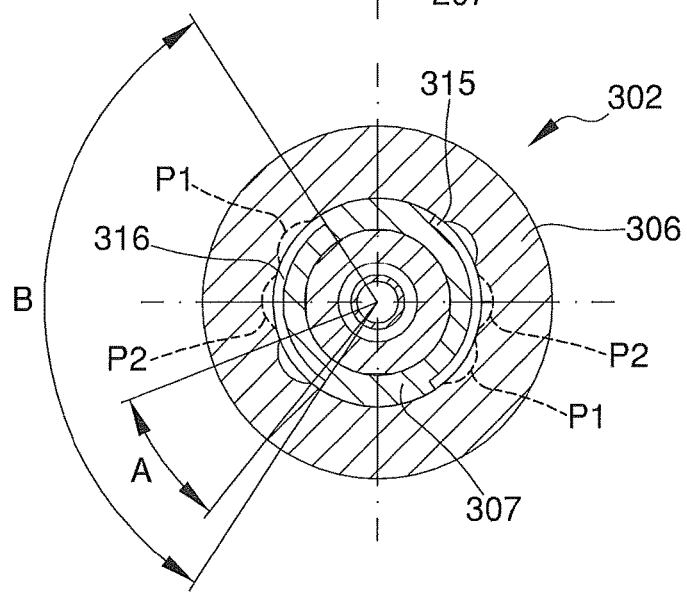

MALE MOULD ELEMENT

The invention concerns a male mould element, which can be used for injection or compression moulding of objects made of polymeric material. The male mould element according to the invention can be used, in particular, to shape an inner surface of hollow objects, e.g. caps for containers, or preforms for containers and in particular preforms per bottles, or also containers. The male mould element according to the invention can also be used to shape substantially flat objects, such as seals for container caps.

International patent application WO 2007/028702 describes a male mould element for internally shaping container caps. The male mould element described in WO 2007/028702 comprises a central core and a tubular component disposed outside the central core. A cooling circuit is fashioned both in the central core and in the tubular component, so that a cooling fluid can flow from the central core toward the tubular component, and from here return to the central core.

The cooling circuit described in WO 2007/028702 has a very high efficiency, because it allows the cooling fluid to be conveyed both into the central core and into the tubular component, near the respective surfaces which form the cap. However, the male mould element described in WO 2007/028702 requires particular techniques, such as so-called "metal injection moulding" (MIM) in order to be constructed. Moreover, since the tubular component is movable relative to central core, between the tubular component and the central core it is necessary to interpose sliding seals, which wear rapidly and must be frequently replaced.

The German patent application DE 10022289 describes a male mould element in which the drawbacks associated with the sliding seals are limited. In fact, the male mould element described in DE 10022289 features a first cooling circuit for cooling the central core, a second cooling circuit for cooling an ejector disposed around the central core, and a third cooling circuit for cooling a rotatable component disposed around the ejector. However, DE 10022289 does not furnish detailed information as to the configuration of the second cooling circuit and the third cooling circuit.

One object of the invention is to improve male mould elements for obtaining an object made of polymeric material by compression or injection moulding.

A further object is to provide a male mould element endowed with a highly efficient cooling system.

Another object is to provide a male mould element which can be effectively cooled and at the same time produced and assembled in a simple manner.

Yet another object is to provide a male mould element which can be effectively cooled and in which the components subject to rapid wear are reduced.

In a first aspect of the invention, there is provided a male mould element comprising a cooling circuit having first passage elements fashioned on a first component of the male mould element and second passage elements fashioned on a second component of the male mould element, the first passage elements and the second passage elements being distributed around a longitudinal axis so that there exist a plurality of angular positions of the first component relative to second component in which the first passage means are in fluid communication with the second passage means, wherein the second component is fixed to the first component by means of a removable connection, so that the second component is mounted non-rotatably relative to the first component during the operation of the male mould element.

Since the first passage elements are in fluid communication with the second passage elements in a plurality of angular positions of the first component relative to second component, the second component can be mounted on the first component so as to assure that a cooling fluid passes from the first component to the second component or vice-verse, also without using timing systems having the purpose of positioning the second component in a predetermined angular position relative to first component.

This makes it possible, and indeed particularly easy, to exploit the removable connection to separate the first component from the second component, for example in order to carry out cleaning or maintenance operations, and then assemble them back together. After assembly, the first component and the second component behave like a single piece, without one rotating relative to the other.

In a second aspect of the invention, there is provided a male mould element extending along a longitudinal axis, the male mould element comprising a cooling circuit having first passage elements fashioned on a first component of the male mould element and second passage elements fashioned on a second component of the male mould element, wherein the first passage elements and the second passage elements are distributed around the longitudinal axis so that there exist a plurality of angular positions of the first component relative to second component in which the first passage elements are in fluid communication with the second passage elements.

Owing to the cooling circuit, it is possible to effectively cool the surfaces of the male mould element which form the desired object. Moreover, since the first passage elements are in fluid communication with the second passage elements in a plurality of angular positions of the first component relative to second component, it is not indispensable to provide complicated timing systems, or particularly narrow geometric or dimensional tolerances in order to assure that the second component is always mounted in a predetermined angular position relative to first component. This makes the male mould element according to the invention particularly simple to assemble.

The expression "angular positions of the first component relative to second component" means positions that can be theoretically defined while the first component and the second component are being assembled to obtain the male mould element. In particular, the aforesaid angular positions can be defined by rotating the first component relative to the second component, or else by rotating the second component relative to the first component, around the longitudinal axis. In other words, it is a matter of angular positions of the first component relative to second component around the longitudinal axis.

Said angular positions can be defined for example during the operations of assembling the male mould element.

This does not imply that the first component is rotatably mounted relative to second component, i.e. that the first component can be rotated relative to second component, or vice-versa, during the operation of the male mould element.

In one embodiment, however the second component is rotated around the longitudinal axis relative to the first component, the first passage elements will be in fluid communication with the second passage elements.

In particular, however the second component is rotated around the longitudinal axis relative to the first component, the first passage elements will be facing the second passage elements.

In this manner, a cooling fluid that circulates in the cooling circuit can pass from the first passage elements to the second passage elements, or vice-versa, however the second component is rotated around the longitudinal axis relative to the first component.

In one embodiment, the first passage elements comprise at least a first passage and the second passage elements comprise at least a second passage, the first passage and the second passage having respective angular dimensions in an interface zone between the first component and the second component. The angular dimension of the first passage is greater than the angular dimension of the second passage. In this manner, the second passage will be maintained facing the first passage along the entire angular extent of the second passage even when the first component is rotated, within certain limits, relative to the second component, or vice-versa. This assures that there will be fluid communication between the first passage elements and the second passage elements in a plurality of relative angular positions of the first component and the second component.

In one embodiment, the first passage elements comprise at least one recess and the second passage elements comprise a plurality of channels, the distance between two adjacent channels and the width of each channel being such that, however the second component is rotated around the longitudinal axis relative to first component, at least one channel is facing said at least one recess.

The first passage elements and the second passage elements thus configured are particularly simple to realize, since they can be obtained by means of simple milling or boring operations, without relying on complicated technologies such as metal injection moulding (MIM).

In one embodiment, the first component and the second component define, in an assembled configuration, a tubular forming member of the male mould element.

The cooling circuit is thus fashioned inside the tubular forming member.

The male mould element can further comprise a central forming core disposed inside the tubular forming member.

In one embodiment, the male mould element further comprises a further cooling circuit for cooling the central forming core, said further cooling circuit being independent of the cooling circuit provided in the tubular forming member.

This enables a male mould element to be obtained which can be cooled in a particularly efficient manner, since the cooling circuit and the further cooling circuit enable both the peripheral areas and central areas of the formed object to be cooled.

Moreover, since the cooling circuit is independent of the further cooling circuit, it is not necessary to use sliding seals even in the case where the central forming core and tubular forming member are movable relative to each other. This makes it possible to limit the use of components subject to wear and therefore to simplify the maintenance of the male mould element.

In one embodiment, the first passage elements are facing the second passage elements in an interface zone in which the second component is in contact with the first component.

The interface zone can extend around the longitudinal axis.

Alternatively, the interface zone can extend transversely to the longitudinal axis, in particular perpendicularly to the longitudinal axis.

The first passage elements can comprise a delivery recess and a return recess, whilst the second passage elements can comprise a plurality of channels distributed around the longitudinal axis.

In one embodiment, a pair of separating surfaces is interposed between the delivery recess and the return recess, each separating surface being in contact with a surface portion of the second component so as to isolate the delivery recess from the return recess.

In particular, at least one channel of said plurality is facing the delivery recess, at least one channel of said plurality is facing the return recess, and at least one channel of said plurality is facing each separating surface.

The delivery recess and the return recess can be fashioned on an inner surface of the first component, whilst the channels of said plurality can be fashioned on an outer surface of the second component.

The tubular forming member can comprise a third component coaxial with the second component.

In one embodiment the channels of said plurality continue along a region of the second component which projects from the first component, a lateral face of the third component facing the channels in said region, so as to close off said channels and define corresponding conduits.

The cooling circuit can comprise a communication conduit, particularly configured as an annular conduit, communicating both with the delivery recess and the return recess through the channels of said plurality, the communication conduit being disposed near said forming surface.

In particular, the communication conduit is defined between the second component and the third component.

In one embodiment, the male mould element further comprises a movement device for causing a relative movement between the central forming core and the tubular forming member such as to disengage an undercut portion formed between the central forming core and the tubular forming member.

In one embodiment, the second component is removably fixed to the first component, in particular screwed onto the first component.

In a third aspect of the invention, there is provided a male mould element for forming an object, comprising a cooling circuit for cooling a portion of the object, and a further cooling circuit for cooling a further portion of the object, said further cooling circuit being independent of said cooling circuit, wherein said cooling circuit comprises an annular conduit, inlet passage elements which extend longitudinally in the male mould element in order to convey a cooling fluid into the annular conduit, outlet passage elements which extend longitudinally in the male mould element in order to draw the cooling fluid from the annular conduit.

Owing to this aspect of the invention, it is possible to obtain a male mould element which can be effectively cooled and at the same time is easy to construct and assemble.

The mutually independent cooling circuit and the further cooling circuit in fact enable distinct portions of the formed object to be cooled even when such portions are shaped by parts of the male mould element which are movable relative to each other.

The inlet passage elements and the outlet passage elements, which extend longitudinally in the male mould element, can be formed with conventional machine tool machining techniques, without relying on complicated technologies such as MIM technology.

Furthermore, the annular conduit is simpler to construct compared to the complicated helical conduits envisaged in the prior art.

In one embodiment, the male mould element has a longitudinal axis.

The inlet passage elements have an angular dimension of at least 10°, particularly greater than 30°, measured along an arc centred on the longitudinal axis.

Analogously, the outlet passage elements have an angular dimension of at least 10°, particularly greater than 30°, measured along an arc centred on the longitudinal axis.

In this manner, the inlet passage elements and the outlet passage elements assure a sufficient flow of cooling fluid for effectively cooling the object that is shaped by the male mould element.

In a fourth aspect of the invention, there is provided a mould element for forming an object by moulding a polymeric material, comprising a cooling circuit for cooling the object, wherein the mould element further comprises a heat pipe interposed between the object and the cooling circuit so as to remove heat from the object and transmit heat to the cooling circuit.

A heat pipe is a closed hollow element made with a heat conducting material, metal in particular, and which contains inside it a refrigerant material, in part in a liquid state and in part in a gaseous state. The heat pipe is capable of removing heat owing to a change of state of the liquid contained inside it.

When the liquid contained inside the heat pipe passes from the liquid state to the gaseous state, a relatively large amount of heat is removed from the moulded object. This amount of heat is greater than the amount of heat that could be removed simply by heating a fluid in the absence of changes of state.

Moreover, since the heat pipe is hermetically sealed, the risks of fluid leaks occurring in proximity to the moulded object are drastically reduced.

Furthermore, once heat pipes of suitable shape have been prepared, they are very easy to assemble.

In one embodiment, a forming surface can be fashioned on the heat pipe in order to form a portion of the object.

This embodiment enables the object to be cooled in a particularly effective manner, because the heat pipe is placed in direct contact with the polymeric material the object is made up of.

In one embodiment, the male mould element comprises a forming element suitable for being interposed between the heat pipe and the object.

In this manner, it is possible to use a heat pipe even when one needs to form objects having a complicated shape, such that it would not be possible to shape the heat pipe according to the shape it is desired to give to the object.

The invention can be better understood and implemented with reference to the appended drawings, which illustrate some example embodiments, which do not limit the implementation thereof, in which:

FIG. 3 is a section taken along plane III-III of FIG. 2;

FIG. 4 is a section taken along plane IV-IV of FIG. 2, in a first position;

FIG. 5 is a section like the one in FIG. 4, in a second position;

FIG. 9 is a section like the one in FIG. 4, referring to a male mould element according to an alternative embodiment;

FIG. 10 is a section like the one in FIG. 4, referring to a male mould element according to a further alternative embodiment;

FIG. 11 is a section like the one in FIG. 4, referring to a male mould element according to another alternative embodiment;

FIG. 1 shows a part of a moulding unit 1, comprising a male mould element 2, also visible in FIG. 2.

The male element 2 can be used to obtain an object 5 made of polymeric material by injection or compression moulding. The object 5 can be a hollow object, such as, for example, a cap for a bottle or more generally speaking a cap for a container. In this case, the male element 2 cooperates with an unillustrated female mould element included in the moulding unit 1.

Alternatively, the object 5 can be a substantially flat object, such as a seal for a bottle cap or more generally speaking a container cap. The seal can be moulded by the male element 2 directly inside a previously formed cap. In this case, the moulding unit 1 comprises, in place of a female mould element, an unillustrated support element serving to support the cap on the inside of which the seal must be formed.

The moulding unit 1 can be included in a moulding apparatus comprising a plurality of moulding units 1, which are equal to each other. If the compression moulding technique is used, the moulding units 1 can be mounted in a peripheral region of a carousel that is rotatable around a rotation axis, for example a vertical one. If the injection moulding technique is used instead, the moulding units 1 can be mounted one beside the other according to a two-dimensional distribution.

Figure 2:
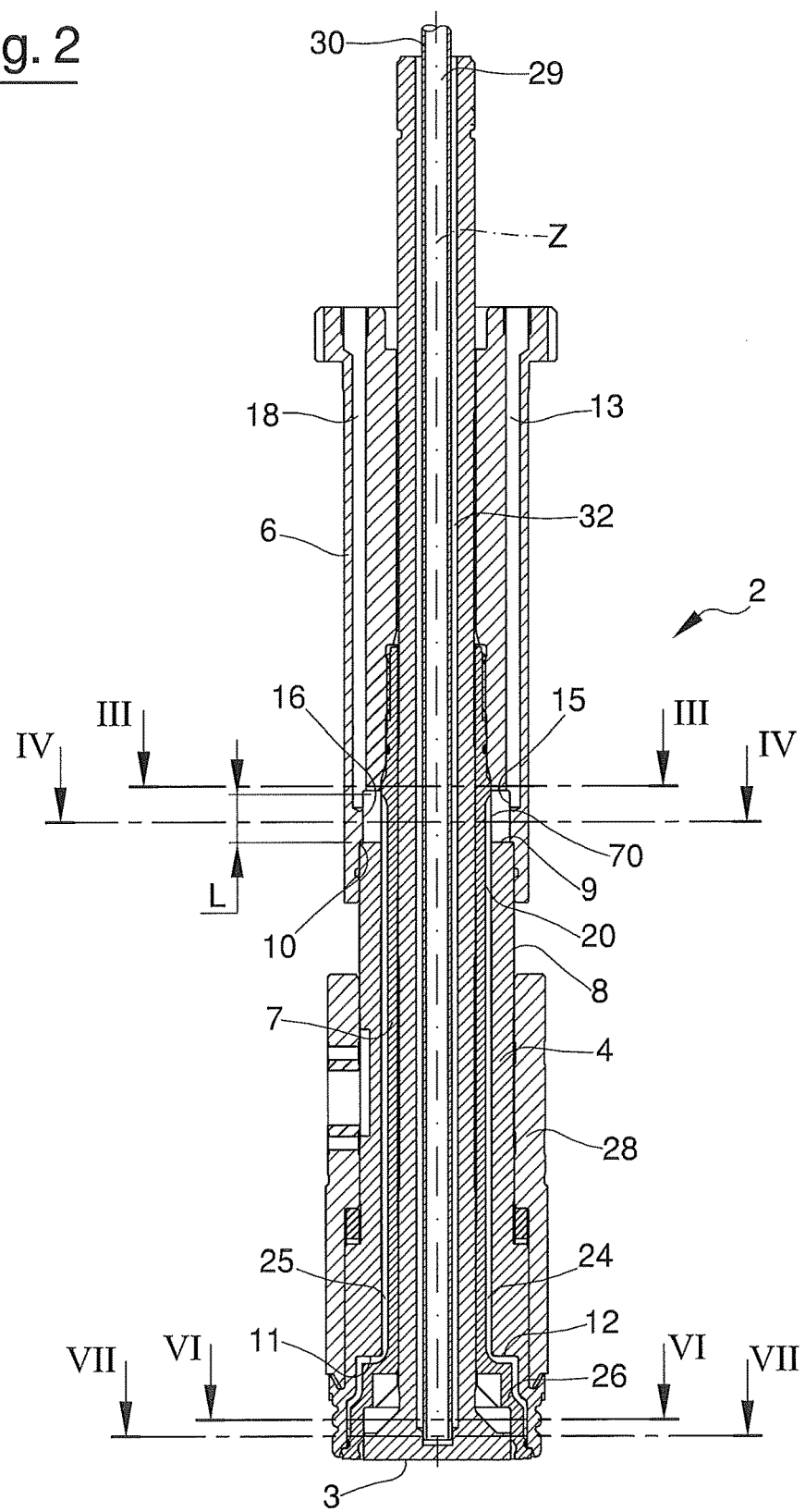
FIG. 2 is a longitudinal section, taken along a plane which is rotated relative to the plane of FIG. 1, showing a male mould element of the moulding unit of FIG. 1.
Figure 8:
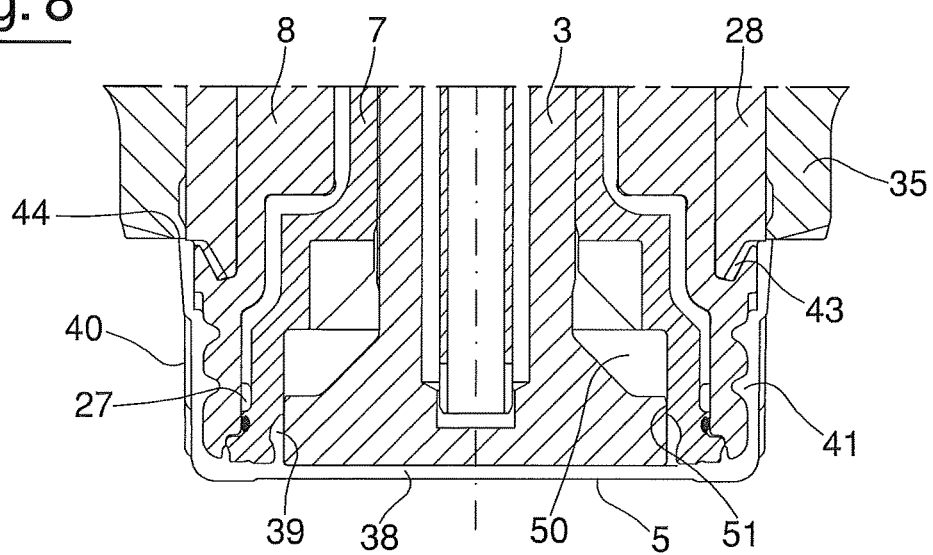
FIG. 8 is an enlarged, interrupted section showing a forming end of the moulding unit of FIG. 1.

As shown in FIG. 2, the male mould element 2 comprises a central forming core 3 which extends along a longitudinal axis Z. In the example illustrated, the longitudinal axis Z is vertical, but in an alternative embodiment the longitudinal axis Z could also be horizontal or else oblique. The central forming core 3 is provided with a forming surface for coming into contact with the polymeric material and forming an inside surface portion of the object 5, for example for internally forming a base wall 38 of a cap or seal, as shown in FIG. 8.

The male mould element 1 further comprises a tubular forming member 4 disposed outside the central forming core 3, that is, surrounding the central forming core 3.

The tubular forming member 4 is likewise provided with a forming surface suitable for coming into contact with the polymeric material so as to form a surface portion of the object 5.

In particular, the central forming core 3 and the tubular forming member 4 cooperate with each other to form a portion of the object 5 provided with an undercut. In the example illustrated, the portion of the object 5 provided with an undercut is a sealing lip 39, shown in FIG. 8, which projects from the base 38 so as to engage, during use, with an inner surface of a neck of the container. The sealing lip 39 allows the container to be sealed in a substantially hermetic manner. The central forming core 3 and the tubular forming member 4 are mounted in such a manner as to be movable relative to each other during a moulding cycle. By moving the tubular forming member 4 relative to the central forming core 3, or vice-versa, the portion of the object 5 provided with an undercut, i.e. the sealing lip 39, can be disengaged from the male element 2.

The tubular forming member 4 comprises a cooling circuit in which a cooling fluid can circulate to cool the parts of the object 5 that are shaped by the tubular forming member 4. The cooling fluid can be a liquid or a gas.

The cooling circuit associated with the tubular forming member 4 is partially defined between a first component 6 and a second component 7 of the tubular forming member 4.

The first component 6, which can be shaped like a sleeve, is disposed around al central forming core 3 in a region farther from the area of the central forming core 3 which forms the object 5.

The second component 7, which can be hollow on the inside and open at both ends, is disposed around the central forming core 3 in a region nearer to the area of the central forming core 3 which forms the object 5. The second component 7 is fastened to the first component 6 by means of a removable connection, for example a threaded connection.

The second component 7 can have a forming end for forming the undercut portion of the object 5, in particular the sealing lip 39. A fastening end of the second component 7, opposite the forming end, is instead fastened to the first component 6.

In particular, the fastening end of the second component 7 is inserted into the first component 6, so that the second component 7 is situated inside the first component 6 for a portion of its length. For the remaining portion of its length, the second component 7 projects outward from the first component 6.

The tubular forming member 4 can further comprise a third component 8, disposed so as to interact with the polymeric material and internally form a side wall 40 of the object 5. If the object 5 is a cap, as shown in FIG. 8, the side wall 40 can comprise fastening elements 41, such as threaded portions or protrusions, to enable the cap to be fastened to a container.

As shown in FIG. 2, the third component 8 has an abutment surface 9 suitable for abutting against a further abutment surface 10 fashioned on the first component 6. The abutment surface 9 is fashioned at one end of the third component 8, opposite a further end of the third component 8 configured to interact with the polymeric material.

On the third component 8, in particular inside the third component 8, there is formed a contact surface 11, against which a shoulder 12 fashioned on the second component 7 can abut.

When the second component 7 is fastened to the first component 6, the third component 8 is disposed outside the second component 7 and is compressed between the first component 6 and the second component 7. If, on the other hand, the second component 7 is separated from the first component 6, the third component 8, too, will be dismounted accordingly.

The components of the tubular forming member 4 are thus removably connected to one another. This makes it particularly simple to disassemble the tubular forming member 4 into its individual components. It is thus possible, if necessary, to replace only one of the components of the tubular forming member 4, while continuing to use the other two. Moreover, the operations of cleaning the cooling circuit associated with the tubular forming member 4 are simplified.

If the object 5 which it is desired to form is a seal, the third component 8 could be omitted, or else it could be devoid of forming surfaces.

The cooling circuit formed in the tubular forming member 4 can comprise an inlet conduit 13 for connecting the first component 6 to an unillustrated cooling fluid source. The inlet conduit 13 extends into the thickness of the first component 6, for example along a direction parallel to the longitudinal axis Z. The inlet conduit 13 can be connected to the cooling fluid source by means of a flexible tube, attached, for example, to an unillustrated inlet coupling.

The cooling circuit comprises first passage elements fashioned in the first component 6 so as to place the cooling fluid source in communication with the second component 7. The first passage elements can be fashioned on an inner surface of the first component 6, in a region of the first component 6 which internally houses a portion of the second component 7.

The first passage elements can comprise a delivery recess 15 for receiving the cooling fluid coming from the source, for example via the inlet conduit 13, and sending the cooling fluid toward the second component 7.

In order to understand how the delivery recess 15 is configured, one can imagine an ideal circular hole C, indicated with a broken line in FIG. 4, which is defined inside the first component 6. One can imagine that the delivery recess 15 is obtained by removing further material from a portion of the ideal circular hole C. In other words, the delivery recess 15 penetrates into the thickness of the first component 6 relative to the ideal circular hole C.

The delivery recess 15 extends along a direction parallel to the longitudinal axis Z. The first passage elements further comprise a return recess 16 fashioned inside the first component 6. In the example illustrated, the delivery recess 15 and the return recess 16 are diametrically opposed to each other. It is however possible to dispose the return recess 16 also in positions that are not diametrically opposed relative to the delivery recess 15, for example at 90° or at 120°.

The return recess 16 serves to collect the cooling fluid after the latter has cooled the portions of the object 5 formed by the tubular forming member 4.

The return recess 16 extends along a direction parallel to the longitudinal axis Z.

The return recess 16 can likewise be imagined as obtained by removing material from a portion of the ideal circular hole C shown with a broken line FIG. 4, so that the return recess 16 penetrates into the thickness of the first component 6 relative to the aforesaid circular hole.

As shown in FIG. 4, on the first component 6, interposed between the delivery recess 15 and the return recess 16, there are separating surfaces 17 capable of engaging with an outer surface of the second component 7 so as to separate the delivery recess 15 from the return recess 16. The separating surfaces 17 can be shaped as portions of cylindrical surfaces.

An outlet conduit 18 communicates with the return recess 16. The outlet conduit 18 is fashioned in the thickness of the first component 6. The outlet conduit 18 enables the cooling fluid to be removed from the tubular forming member 4. For this purpose, an outlet coupling can be connected to the outlet conduit 18 and a flexible tube can be attached to said coupling.

The cooling circuit provided in the tubular forming member 4 further comprises second passage elements fashioned on the second component 7. The second passage elements can comprise a plurality of channels 20 distributed over an outer surface of the second component 7 around the longitudinal axis Z. The outer surface on which the channels 20 are fashioned is at least partially facing the inner surface of the first component 6, on which the delivery recess 15 and the return recess 16 are fashioned.

Each channel 20 can extend along a direction parallel to the longitudinal axis Z.

Each channel 20 can be configured as a groove, in particular a rectilinear groove.

The channels 20 enable the cooling fluid coming from the first component 6 to be conveyed toward the surfaces of the object 5 which need to be cooled and the cooling fluid that has cooled the object 5 to be re-conveyed toward the first component 6.

The channels 20 interact with the delivery recess 15 and the return recess 16 in an interface zone 70 defined between the first component 6 and the second component 7. The interface zone 70 extends around the longitudinal axis Z for a predetermined length L, as shown in FIG. 2.

The channels 20 can be distributed in an equidistant manner around the longitudinal axis Z.

The channels 20 are distributed around the longitudinal axis Z in a manner such that it is possible define a plurality of angular positions of the first component 7 relative to the second component 6 in which at least one channel 20 will be in fluid communication with the delivery recess 15, while at least one further channel 20 will be in fluid communication with the return recess 16. In other words, if the second component 7 is rotated around the longitudinal axis Z relative to first component 6, for example during assembly, the second component 7 can be disposed in a plurality of angular positions, in each of which at least one channel 20 is facing the delivery recess 15, and at least one further channel 20 is facing the return recess 16.

This can be obtained, for example, by appropriately selecting the width of the channels 20, i.e. the dimension of the channels 20 perpendicular to the longitudinal axis Z, and the distance between two adjacent channels 20.

In the example illustrated, as shown in FIG. 5, each channel 20 has an angular dimension A measured around the longitudinal axis Z, i.e. it subtends an angle A. The delivery recess 15 and the return recess 16 each have an angular dimension B measured around the longitudinal axis Z, i.e. each subtends an angle B. The angular dimensions A and B are calculated in the interface zone 70 between the first component 6 and the second component 7, in which the channels 20 are facing the delivery recess 15 and the return recess 16.

The angular dimension A of each channel 20 is less than the angular dimension B of the delivery recess 15 and the return recess 16. This assures that, even if the second component 7 is rotated relative to the first component 6, for example during assembly, at least one channel 20 can be facing the delivery recess 15 along its entire angular dimension A. The same applies for the return recess 16.

In the example of FIG. 4, irrespective of the angular position of the second component 7 relative to the first component 6 (that is, however the second component 7 is rotated around the longitudinal axis Z relative to the first component 6), at least one channel 20 will be in fluid communication with the delivery recess 15, so that the cooling fluid can pass from the delivery recess 15 into said at least one channel 20. Moreover, at least one channel 20 will always be in fluid communication with the return recess 16, so that the cooling fluid can pass from the channel 20 into the return recess 16.

Owing to the width of the channels 20, i.e. the dimension of the channels 20 perpendicular to the longitudinal axis Z, and the distance between two adjacent channels 20, in the example of FIG. 4 it is in fact possible to assure that when the second component 7 is at least partially inserted inside the first component 6, however the second component 7 may be rotated, at least one channel 20 will be facing the delivery recess 15 and at least one channel 20 will be facing the return recess 16.

An analogous result can also be obtained by acting on the width, number and distance of the recesses provided on the first component 6. In other words, rather than having only one delivery recess 15 and only one return recess 16, the first component 6 could have a plurality of delivery recesses and/or a plurality of return recesses.

The second component 7 is delimited, along a portion thereof intended to be inserted inside the first component 6, by a cylindrical lateral surface having a diameter D. The channels 20 penetrate into the cylindrical lateral surface of the second component 7. Two consecutive channels 20 are therefore separated by a surface portion 21, which, in the example illustrated, is a cylindrical surface portion. The diameter D can be equal to the diameter of the ideal circular hole C shown with a broken line in FIG. 4, with reference to the first component 6. In other words, the diameter D of the cylindrical lateral surface of the second component 7 can be equal to the diameter of the ideal cylinder portion delimited by the separating surfaces 17 fashioned on the first component 6.

In this manner, the separating surfaces 17 act as guide surfaces enabling the second component 7 to be guided as it is partially inserted inside the first component 6. The separating surfaces 17 act as guide surfaces also when the second component 7 is rotated around the longitudinal axis Z relative to the first component 6, for example in order to be screwed onto the first component 6 or unscrewed from the latter.

The cooling circuit is however capable of functioning with acceptable efficiency even if there is a small amount of play or slight interference between the diameter D and the diameter of the ideal circular hole C.

The separating surfaces 17 and the surface portions 21 can be dimensioned in a manner such that, irrespective of the angular position of the second component 7 relative to first component 6 (that is, however the second component 7 is rotated around the longitudinal axis Z relative to first component 6), at least one surface portion 21 of the second component 7 engages or is in contact with a separating surface 17 of the first component 6.

The surface portions 21 in contact with the separating surfaces 17 separate the delivery recess 15 from the return recess 16, i.e. they prevent the cooling fluid from passing directly from the delivery recess 15 to the return recess 16 or vice-versa, without reaching a forming end of the tubular forming member 4.

In this manner, the separating surfaces 17 define, between the first component 6 and the second component 7, an inlet passage 22 and an outlet passage 23, shown in FIGS. 4 and 5.

The inlet passage 22 communicates with the inlet conduit 13, whereas the outlet passage 23 communicates with the outlet conduit 18.

The inlet passage 22 is defined between the delivery recess 15 and a certain number of channels 20, whereas the outlet passage 23 is defined between the return recess 16 and other channels 20.

In the example illustrated, twenty-eight channels 20 are fashioned on the second component 7. FIGS. 4 and 5 show two extreme positions of the second component 7 relative to first component 6.

In the position shown in FIG. 4, seven channels 20 communicate with the delivery recess 15, whereas another seven channels 20 communicate with the return recess 16. Moreover, seven channels 20 are completely facing each separating surface 17 of the first component 6. This position corresponds to the maximum number of channels 20 communicating respectively with the delivery recess 15 and with the return recess 16.

In the position shown in FIG. 5, six channels 20 communicate with the delivery recess 15 and six channels 20 communicate with the return recess 16. Completely facing each separating surface 17 of the first component 6 there are eight channels 20, which in this position are inactive. The position shown in FIG. 5 corresponds to the minimum number of channels 20 communicating respectively with the delivery recess 15 and with the return recess 16.

Depending on how the second component 7 is mounted relative to the first component 6, the second component 7 can also be situated in other intermediate positions between the position shown in FIG. 4 and the one shown in FIG. 5. In all of these intermediate positions, there are nonetheless channels 20 communicating with the delivery recess 15 and further channels 20 communicating with the return recess 16. Other channels 20 are instead facing the separating surfaces 17.

Generally speaking, the number of channels 20 facing each separating surface 17 will depend not only on the relative position of the first component 6 and the second component 7, but also on the dimensions and distribution of the channels 20 on the second component 7.

It has been verified that the effectiveness of cooling is higher when the dimensions and distribution of the first passage elements and the second passage elements are such that at least one channel 20 is facing each separating surface 17 for the entire angular extent, i.e. the two surface portions 21 which delimit them are both in contact with a separating surface 17. If the above condition is satisfied, the inlet passage 22 will be isolated from the outlet passage 23 by elements of at least one channel 20, on both sides of the inlet passage 22 and of the outlet passage 23. The leakage of cooling fluid between the inlet passage 22 and the outlet passage 23 is thus minimized. This will prevent the cooling fluid going toward the object 5 from being prematurely heated due to mixing with the cooling fluid coming back after having cooled the object 5.

The above condition is not essential, however, as the cooling circuit is capable of cooling the object 5, albeit less effectively, even in the event that only a portion of surface 21 is in contact with a separating surface 17, so that there is not a channel 20 completely facing the separating surface 17.

The channels 20 extend not only along the portion of the second component 7 disposed inside the first component 6, but also continue along the further portion of the second component 7 which projects from the first component 6, parallel to the longitudinal axis Z. In this further portion, an inner wall of the third component 8 is facing the channels 20. The inner wall of the third component 8 closes off the channels 20, so as to define corresponding conduits. In particular, between the second component 7 and the third component 8, there are defined a group of delivery conduits 24, which communicate with the inlet passage 22. The channels 20 further define, again between the second component 7 and the third component 8, a group of return conduits 25 which communicate with the outlet passage 23.

In proximity to a forming end thereof, the second component 7 is endowed with a broadened region 26 delimited by the shoulder 12.

Figure 6:
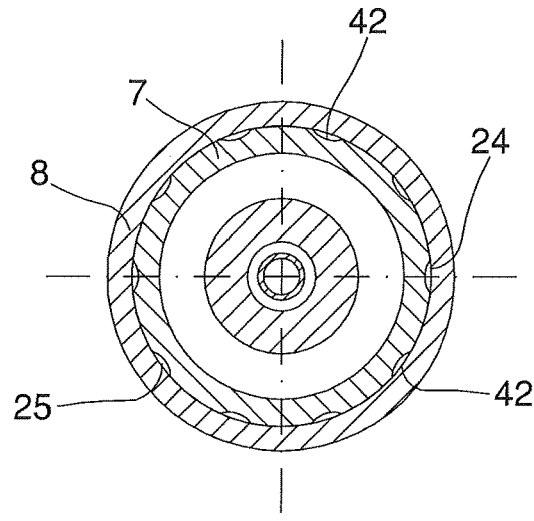
FIG. 6 is a section taken along plane VI-VI of FIG. 2.

The channels 20 communicate with further channels 42 fashioned in the broadened region 26 of the second component 7, shown in FIG. 6. Owing to the further channels 42, between the second component 7 and the third component 8, also in the broadened region 26, the delivery conduits 24 and the return conduits 25 continue to be defined, so that the cooling fluid can arrive as close as possible to the polymeric material to be formed.

Figure 7:
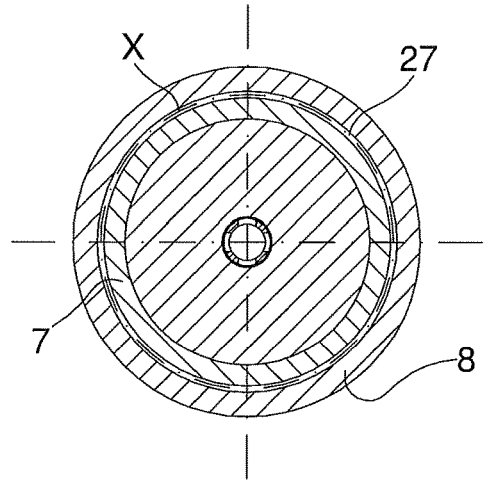
FIG. 7 is a section taken along plane VII-VII of FIG. 2.

The delivery conduits 24 lead into an annular conduit 27, shown in FIG. 7, which extends around the longitudinal axis Z in an interface zone between the second component 7 and third component 8, so as to also intercept the return conduits 25. The annular conduit 27 thus acts as a communication conduit, which places the delivery conduits 24 in communication with the return conduits 25.

The annular conduit 27 extends along a closed line X, in particular of a circular shape, disposed in a plane perpendicular to the longitudinal axis Z.

The annular conduit 27 is disposed in proximity to a forming end of the tubular forming member 4, as close as possible to the surfaces of the tubular forming member 4 intended to interact with the polymeric material to be formed.

In the embodiment illustrated, the inlet conduit 13, the inlet passage 22, the delivery conduits 24, the annular conduit 27, the return conduits 25, the outlet passage 23 and the outlet conduit 18 define the cooling circuit of the tubular forming member 4. The male element 2 further comprises a further cooling circuit, fashioned in the central forming core 3 in order to cool the area of the object 5 formed by the central forming core 3. As shown in FIG. 2, a longitudinal hole is fashioned inside the central forming core 3 in a position coaxial with the longitudinal axis Z. A tubular element 30 is inserted inside this longitudinal hole. Inside the tubular element 30 there is defined an intake conduit 29 for delivering a cooling fluid into the internal forming core 3. The intake conduit 29 can be connected to a cooling fluid source by means of an unillustrated tube, connected to a first coupling 31 shown in FIG. 1.

A removal conduit 32 is defined in a gap between the tubular element 30 and the central forming core 3. Via the removal conduit 32, the cooling fluid can leave the central forming core 3 after having cooled the object 5.

Figure 1:
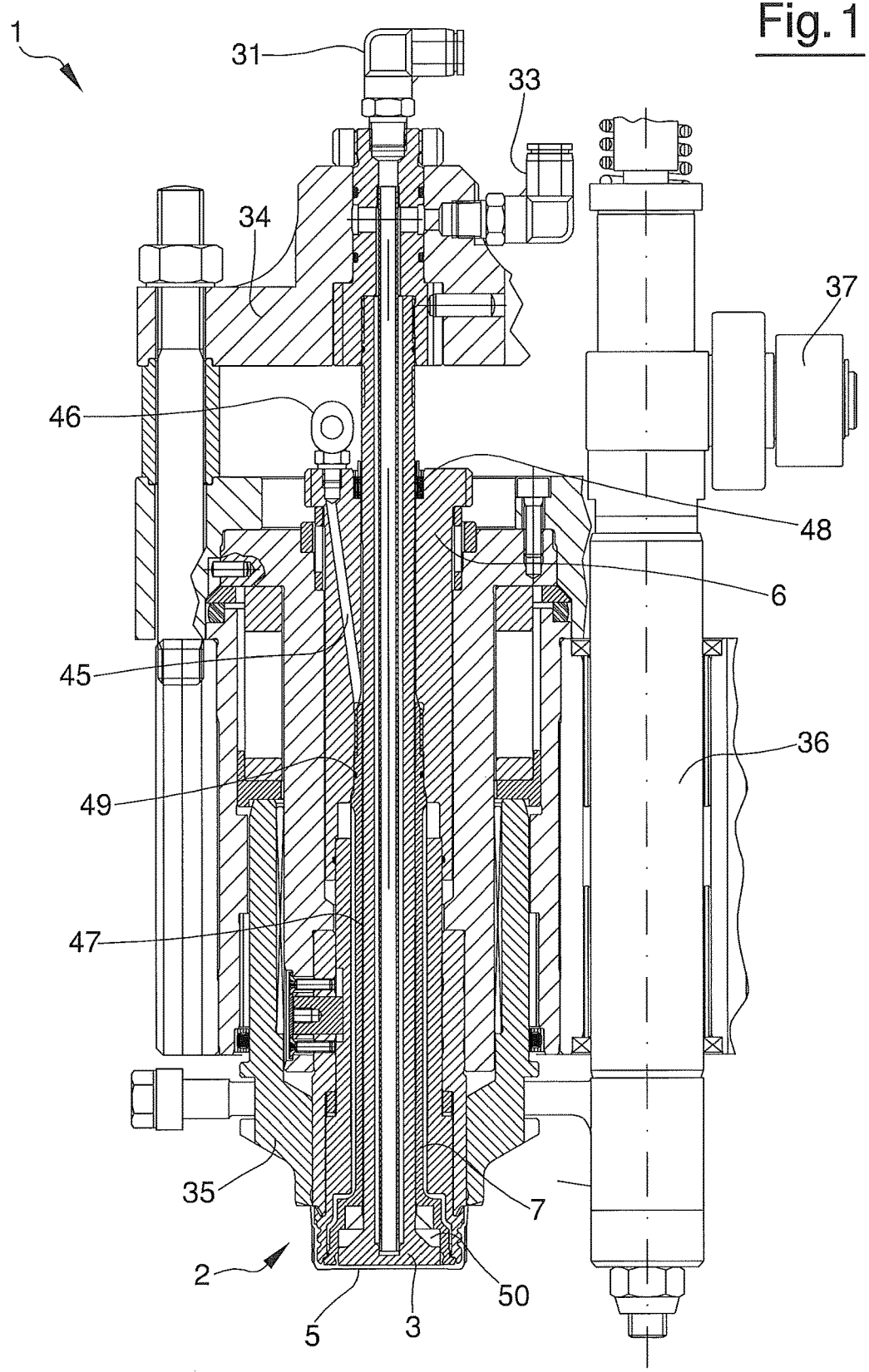
FIG. 1 is a longitudinal section showing a part of a moulding unit for producing caps.

In particular, the removal conduit 32 can be connected to an unillustrated outlet tube by means of a second coupling 33 shown in FIG. 1.

The cooling circuit fashioned in the tubular forming member 4 is thus independent of the further cooling circuit fashioned in the central forming core 3, in the sense that the two cooling circuits do not communicate with each other inside the tubular forming member 4 or inside the central forming core 3.

The male element 2 can further comprise a sleeve element 28, disposed around the third component 8. If the object 5 is a cap for a container, the sleeve element 28 can have a forming surface suitable for coming into contact with the polymeric material so as to form, together with the third component 8, one or more tabs 43 of a guarantee ring of the cap, as shown in FIG. 8.

As shown in FIG. 1, the central forming core 3 is fixed to a support structure 34 of the moulding unit 1.

The moulding unit 1 further comprises an extractor element 35 that is able to interact with an edge zone 44 of the object 5, shown in FIG. 8, to remove the object 5 from the male element 2. The extractor element 35 can be handled by a movement device 36, which can comprise, for example, a cam 37. The movement device 36 can be configured to move the extractor element 35 along a direction parallel to the longitudinal axis Z, without the extractor element 35 rotating around the longitudinal axis Z.

The male element 2 further comprises a delivery arrangement for delivering a pressurized fluid, particularly a gas, such as, for example, compressed air, between the object 5 and the surfaces of the male element 2 which interact with the object 5. The delivery arrangement can be configured to deliver the pressurized fluid toward the base wall 38 of the object 5, in particular in the location of the sealing lip 39.

As shown in FIG. 1, the delivery arrangement comprises an initial conduit 45, fashioned in the first component 6, for example along a direction that is oblique relative to the longitudinal axis Z. A connector 46 can be connected to the initial conduit 45 in order to connect the initial conduit 45 to a feed tube for the pressurized fluid, not shown in FIG. 1. The initial conduit 45 leads into a region of the first component 6 that is intended to receive the second component 7. When the male element 2 is disposed in an assembled configuration, the initial conduit 45 communicates with a gap 47 defined between the second component 7 and the central forming core 3.

A first sealing ring 48 is interposed between the first component 6 and the central forming core 3 in an end region of the first component 6 which is farther from the object 5. A second sealing ring 49 is interposed between the first component 6 and the second component 7 in a further region of the second component 6, which is closer to the object 5 relative to the end region in which the first sealing ring 48 is disposed. The first sealing ring 48 and the second sealing ring 49 significantly limit, or even prevent, leakage of the pressurized fluid from the first component 6 toward the outside.

The gap 47 communicates with a chamber 50 defined between the broadened region 26 of the second component 7 and the forming end of the central forming core 3. From the chamber 50, the pressurized fluid leaves through an interface 51, visible in FIG. 8, which is defined between the central forming core 3 and the second component 7, in order to act upon the object 5. The pressurized fluid can thus facilitate the detachment of the object 5 from the male element 2.

During operation, the polymeric material is shaped between the male element 2 and an unillustrated female element, or else between the male element 2 and a container cap, if it is desired to mould a seal directly inside a cap.

The cooling fluid enters the tubular forming member 4 through the inlet conduit 13. From here, the cooling fluid passes into the delivery recess 15. Through the channels 20 facing the delivery recess 15, the cooling fluid passes into the delivery conduits 24 and from here reaches the annular conduit 27. Owing to the annular conduit 27, the cooling fluid circulates all around the second component 7, and then moves away from the forming end through the return conduits 25. The cooling fluid thus cools the undercut portion of the object 5, in particular the sealing lip 39 and, if the object 5 is a cap, the side wall 40 of the cap as well, together with the threads or other fastening elements 41 fashioned thereupon.

From the return conduits 25, the cooling fluid arrives at the outlet passage 23, owing to the channels 20 facing the return recess 16. From here, the cooling fluid leaves the tubular forming member 4 through the outlet conduit 18.

Moreover, a cooling fluid enters the intake conduit 29 of the central forming core 3 by means of the first coupling 31. Through the intake conduit 29, the cooling fluid arrives in proximity to the forming surface of the central forming core 3 so as to cool a part of the object 5, for example the base wall 38 of the cap or of the seal. The cooling fluid then passes into the removal conduit 32 and leaves the central forming core 3 through the second coupling 33.

When the object 5 is sufficiently cooled, an unillustrated actuation device moves the female mould element and the male element 2 relative to each other so as to open the mould. If the object 5 is a cap, the latter remains associated with the male element 2 owing to threads or other fastening elements 41 which engage with the male element 2.

The movement device 36 moves the extractor element 35, which acts on an edge zone 44 of the cap, exerting on the edge zone 44 a force tending to remove the cap from the male element 2, that is, a force directed toward the female mould element. Since the cap engages with the male element 2 owing to threads or other fastening elements 41, during an initial portion of the stroke of the extractor element 35, the cap draws along with it the outer forming member 4, which moves integrally with the cap, for example compressing an elastic element such as a spring. The central forming core 3 instead remains stationary, since it is fixed to the support structure 34. The sealing lip 39 of the cap can thus disengage from the central forming core 3 and subsequently deform toward the inside of the cap until detaching itself from the tubular forming member 4 as well.

The movement device 36 thus enables a relative movement to be produced between the central forming core 3 and the tubular forming member 4, such as to enable the sealing lip 39 of the cap, i.e. the undercut portion of the object 5, to be detached from the male element 2.

The pressurized fluid coming from the initial conduit 45 and delivered in proximity to the sealing lip 39 facilitates the detachment of the sealing lip 39 from the second component 7 and provokes a swelling of the object 5, so that the object 5 can be more easily removed from the male element 2.

The cooling circuit associated with the tubular forming member 4 and the further cooling circuit associated with the central forming core 3 enable effective cooling of the components they are associated with also when the tubular forming member 4 moves relative to the central forming core 3. If flexible tubes are connected to the inlet conduit 13 and to the outlet conduit 18, the cooling fluid can enter and exit the cooling circuit provided in the tubular forming member 4 even when the latter moves relative to the central forming core 3.

Since two separate cooling circuits are provided, it is not necessary to use sliding seals interposed between the tubular forming member 4 and the central forming core 3 in order to prevent leakage of cooling fluid when the tubular forming member 4 moves relative to the central forming core 3. The lifespan of the male element 2 is thus lengthened and the maintenance thereof is simplified.

After the cap, pushed by the extractor element 35, has been moved along a predefined travel path, the tubular forming member 4 is stopped, for example owing to a mechanical limit switch.

The extractor element 35 instead continues to move, pushing the cap toward the female mould element. Consequently, the side wall of the cap is deformed and the cap disengages from the tubular forming member 4. At this point, the cap can be collected and taken away by an unillustrated removal device.

The cooling circuit associated with the tubular forming member 4 can be realized in a particularly simple manner, using traditional boring and milling operations. Moreover, the tubular forming member 4 can be rapidly assembled without using complicated timing systems serving to assure that the second component 7 is always in a predetermined angular position relative to first component 6. The cooling circuit fashioned in the tubular forming member 4 in fact functions correctly however the second component 7 is rotated around the longitudinal axis Z relative to first component 6.

FIG. 9 shows a sectional view of a male mould element 102 according to an alternative embodiment. The male mould element 102 comprises a first component 106 provided with first passage elements including a delivery recess 115 and a return recess 116, similar to the delivery recess 15 and return recess 16 of the male element 2 shown in FIGS. 1 to 8. The male element 102 further comprises a second component 107 which is functionally similar to the second component 7 of the male element 2 shown in FIGS. 1 to 8. The second component 107 is provided with second passage elements comprising a plurality of channels 120.

The main difference between the male element 102 shown in FIG. 9 and the male element 2 shown in FIGS. 1 to 8 consists in the fact that the channels 120 frontally communicate with the delivery recess 115 and the return recess 116. In other words, the channels 120 are facing the delivery recess 115 and return recess 116 along an interface zone configured as a plane that is transverse, in particular perpendicular, to the longitudinal axis Z. In contrast, in the embodiment of FIGS. 1 to 8, the interface zone between the channels 2 and the recesses 15, 16 had a cylindrical configuration.

The second component 107 can have a tubular configuration, in which case the channels 120 are fashioned on an inner surface of the second component 107. The first component 106 and the second component 107 are disposed in sequence along the longitudinal axis Z. A tubular component 100 can be disposed inside the first component 106 and the second component 107 so as to radially close off the delivery recess 115, the return recess 116 and the channels 120.

For the male element 102 as well, it is possible to define a plurality of angular positions in which the first passage elements fashioned on the first component 106 are in fluid communication with the second passage elements fashioned on the second component 107. To be precise, irrespective of the angular position of the second component 107 relative to the first component 106, there will always be at least one channel 120 facing the first recess 115 and at least one further channel 120 facing the second recess 116.

The channels 120 communicating with the delivery recess 115 define a plurality of inlet passages 122, leading into an annular conduit that is wholly analogous to the annular conduit 27 shown in FIG. 7. The channels 120 communicating with the return recess 116 instead define a plurality of outlet passages 123, communicating with the annular conduit so as to remove the cooling fluid from it.

One or more channels 120, shown with a broken line in FIG. 9, can also be facing respective portions of the first component 106 which separate the delivery recess 115 from the return recess 116. Said channels separate the delivery recess 115 from the return recess 116.

FIG. 10 shows a sectional view of a male mould element 202 according to an alternative embodiment, comprising a tubular forming member which includes a first component 206 and a second component 207, the second component 207 being partially inserted inside the first component 206. The male element 202 shown in FIG. 10 differs from the male element 2 shown in FIGS. 1 to 8 mainly because it exhibits an inversion in the location of the delivery recess, return recess and the channels compared to the male element 2 shown in FIGS. 1 to 8.

In particular, on the first component 206 of the male element 202 a plurality of channels 220 are fashioned, which extend longitudinally around the longitudinal axis Z. The channels 220 are obtained on an inner surface of the first component 6. The second component 207 is instead provided with a delivery recess 215 and a return recess 216, fashioned on an outer surface of the second component 207, suitable for being inserted inside the first component 206. The delivery recess 215 and the return recess 216 can be diametrically opposed. The delivery recess 215 and the return recess 216 each have an angular dimension, measured around the longitudinal axis of the male element 202, which is greater than the angular extent of each channel 220. In this manner, it is possible to define a plurality of angular positions of the second component 207 relative to first component 206, in which at least one channel 220 will communicate with the delivery recess 215 and at least one further channel 220 will communicate with the return recess 216.

In particular, since the channels 220 are uniformly distributed around the longitudinal axis, irrespective of the angular position of the first component 206 relative to second component 207, there will always be at least one channel 220 facing the delivery recess 215 and at least one further channel 220 facing the return recess 216.

The channel or channels 220 facing the delivery recess 215 define an inlet passage 222. The channels 220 also continue along a portion of the second component 207 which protrudes from the first component 206. Here the channels 220 are closed off, for example, by a third component disposed around the second component 207. The channels 220 lead into an annular conduit similar to the annular conduit 27 of FIG. 7, so that the inlet passage 222 is made to communicate with the annular conduit.

Analogously, the channel or channels 220 facing the return recess 216 define an outlet passage 223, likewise communicating with the annular conduit.

FIG. 11 shows a sectional view of a male mould element 302 according to an alternative embodiment. The male mould element 302 comprises a first component 306 and a second component 307, at least partially inserted inside the first component 306.

On the second component 307 a delivery recess 315 and a return recess 316 are fashioned which can be disposed on an outer surface of the second component 307, for example in diametrically opposed positions. The delivery recess 315 and the return recess 316 extend parallel to the longitudinal axis of the male mould element 302.

On the first component 306 a pair of channels 320 are fashioned; they are disposed, for example, in diametrically opposed positions and extend parallel to the longitudinal axis of the male mould element 302.

The channels 320 are fashioned on an inner surface of the first component 306, placed in contact with the outer surface of the second component 307 on which the delivery recess 315 and the return recess 316 are fashioned.

Each channel 320 has an angular dimension A, which is measured around the longitudinal axis of the male mould element 302 and smaller than the angular dimension B of the delivery recess 315 and the return recess 316. For example, the angular dimension B can be three to four times as large as the angular dimension A.

In this manner, there will be a plurality of angular positions of the first component 306 relative to the second component 307 in which the delivery recess 315 will communicate with a channel 320 and the return recess 316 will communicate with the other channel 320. In FIG. 11, by way of example, one of these positions has been shown with a solid line and another two of these positions, indicated respectively as P1 and P2, are shown with a broken line.

The second component 307 can be removably mounted on the first component 306. For example, the second component 307 can be screwed onto the first component 306. In order to assure that, when the first component 306 is locked onto the second component 307, the delivery recess 315 will be facing one channel 320 and the return recess 316 will be facing the other channel 320, it is sufficient to provide for a relatively wide tolerance, for example of around 30°, as regards the starting point of the threads fashioned on the first component 306 and the second component 307. In fact, since there exists a plurality of angular positions in which the first passage elements, i.e. the channels 320, are in fluid communication with the second passage elements, i.e. the delivery recess 315 and the return recess 316, the cooling fluid can pass from the first component 306 to the second component 307 or vice-versa even if a relatively wide tolerance is provided for as regards the starting point of the respective threads.

FIG. 11 thus provides an example in which the first passage elements will not be in fluid communication with the second passage elements however the second component 307 is rotated relative to the first component 306. Nonetheless, the channels 320 and recesses 315, 316 are dimensioned so as to be made to communicate owing to machining tolerances that are easy to achieve without relying on complicated timing systems.

Figure 12:
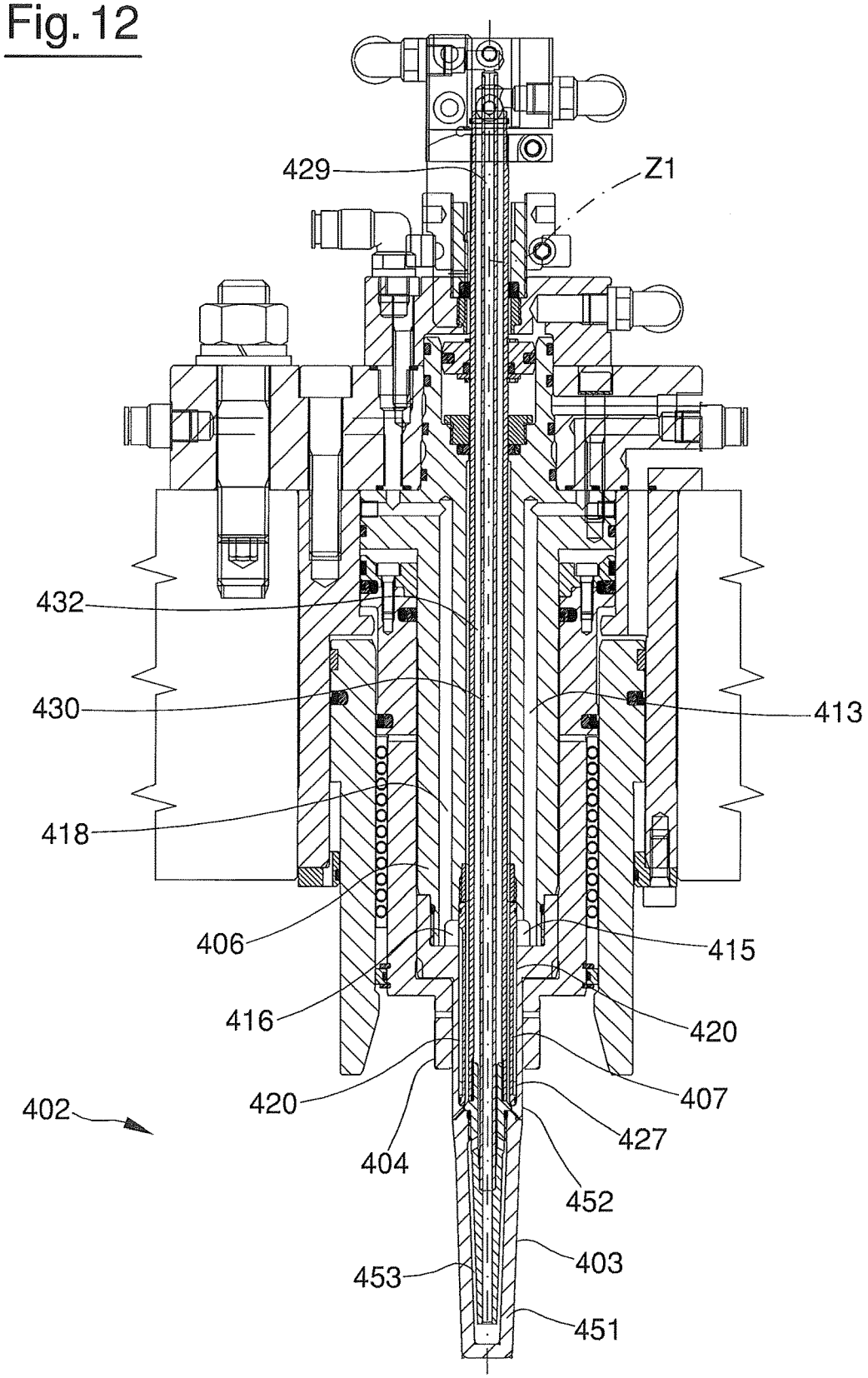
FIG. 12 is a section like the one in FIG. 1, showing a part of a moulding unit for producing preforms.

FIG. 12 shows a male mould element 402 according to an alternative embodiment.

Whereas the male mould element 2 shown in FIGS. 1 and 2 was configured to form caps for containers, the male mould element 402 shown in FIG. 12 is configured to mould, by injection or compression, preforms for containers, in particular bottles. The preforms obtained by means of the male mould element 402 can be subsequently transformed into containers, in particular bottles, by blowing or stretch-blowing.

The male mould element 402 is included in a moulding unit which also comprises an unillustrated female mould element, suitable for externally forming the preform. The moulding unit further comprises at least two mobile inserts for externally forming a neck of the preform, provided with an undercut zone. The mobile inserts define a divided neck mould.

The male mould element 402 comprises a central forming core 403 suitable for internally forming the preform.

In the example illustrated, the central forming core 403 comprises a first forming element 451, suitable for internally forming a bottom of the preform and a portion of a side wall of the preform closer to the bottom. The central forming core 403 further comprises a second forming element 452, suitable for internally forming a portion of the side wall of the preform farther from the bottom. The second forming element 452 is fixed to the first forming element 451.

In an alternative embodiment, the central forming core 403 could be made in one piece.

The male mould element 402 further comprises an annular forming member 404 suitable for forming an annular edge of the preform, which delimits the preform from the part opposite the bottom of the preform itself.

The annular forming member 404 surrounds the central forming core 403. The latter projects from the annular forming member 404 toward the unillustrated female mould element.

The annular forming member 404 and the central forming core 403 can be movable relative to each other during the operation of the male mould element 402, particularly when the mould is closed to form the preform and when the preform needs to be extracted from the mould.

The male mould element 402 comprises a first component 406, which extends along a longitudinal axis Z1.

The male mould element 402 further comprises a second component 407 connected to the first component 406. The second component 407 can be mounted on the first component 406 by means of a removable connection, for example by means of a thread. In the example illustrated, the second component 407 is screwed directly onto the first component 406.

The central forming core 403 can be supported by the first component 406, for example screwed onto the first component 406.

The second component 407 extends in part inside the first component 406 and in part inside the central forming core 403.

In the male mould element 402, there is fashioned a cooling circuit in which a cooling fluid, in a liquid or gaseous state, can circulate to cool the preform.

The cooling circuit can comprise an inlet conduit 413 fashioned in the first component 406. The inlet conduit 413 can extend at least in part along a direction parallel to the longitudinal axis Z1.

The cooling circuit can further comprise an outlet conduit 418, likewise fashioned in the first component 406. The outlet conduit 418 can extend at least in part along a direction parallel to the longitudinal axis Z1, for example in a position diametrically opposed to the inlet conduit 413.

On the first component 406, there are fashioned first passage elements for the cooling fluid. The first passage elements can comprise a delivery recess 415 and a return recess 416 provided on an inner surface of the first component 406. In particular, the first passage elements can be fashioned at one end of the first component 406, in which an end region of the second component 407 is inserted.

The inlet conduit 413 leads into the delivery recess 415, whereas the return conduit 418 leaves the return recess 416.

On the second component 407 there are fashioned second passage elements, which can comprise a plurality of channels 420 provided on an outer surface of the second component 407. The channels 420 can extend parallel to the longitudinal axis Z1 and can be uniformly distributed around the longitudinal axis Z1.

The channels 420 extend into the end region of the second component 407 inserted inside the first component 406, so that they can be facing the delivery recess 415 or return recess 416. The channels 420 moreover continue into a portion of the second component 407 which protrudes from the first component 406, toward the preform to be formed. In this portion, the channels 420 are closed off radially by the central forming core 403.

The first passage elements and the second passage elements are distributed around the longitudinal axis Z1 in such a way that it is possible define a plurality of angular positions of the second component 407 relative to the first component 406, around the longitudinal axis Z1, in which the first passage elements will be in fluid communication with the second passage elements. For this purpose, the delivery recess 415, the return recess 416 and the channels 420 can have any of the configurations shown in FIGS. 4 and 5 and 9 to 11.

In particular, the first passage elements and the second passage elements can be configured in such a way that, however the second component 407 is angularly positioned relative to the first component 406, at least one channel 420 will always be facing the outlet recess 415 and at least one further channel 420 will always be facing the return recess 416. In this manner, the cooling circuit will function effectively however the second component 407 is mounted on the second component 406. It is thus not necessary to use complicated timing systems.

The cooling circuit further comprises an annular conduit 427, which extends around the longitudinal axis Z1. A median line of the annular conduit 427 extends in a plane that is transverse, in particular perpendicular, to the longitudinal axis Z1. The annular conduit 427 can be defined between the second component 407 and the central forming core 403.

The channels 420 extend along the outer surface of the second component 407 until reaching the annular conduit 427.

The cooling fluid enters the male mould element 2 through the inlet conduit 413, from where it passes into the delivery recess 415. Through the channels 420 facing the delivery recess 415, the cooling fluid then arrives in the annular conduit 427. From here, the cooling fluid passes into the channels 420 communicating with the return recess 416, after which it exits the male mould element 402 through the outlet conduit 418.

The annular conduit 427 is disposed in proximity to a surface of the central forming core 403 which forms an open end of the preform. The annular conduit 427 is therefore intended to cool the neck of the preform.

The male mould element 402 further comprises a further cooling circuit for cooling the bottom of the preform. The further cooling circuit is also intended to cool the side wall of the preform, i.e. the portion of the preform interposed between the neck and the bottom.

The further cooling circuit comprises an intake conduit 429, which extends along the longitudinal axis Z1 inside a tubular element 430, coaxial with the first component 406. The intake conduit 429 continues inside the central forming core 403 and ends in proximity to a portion of the central forming core 403 which forms the bottom of the preform.

An annular chamber 453 is defined inside the central forming core 403 so as to enable the cooling fluid coming from the intake conduit 429 to cool the side wall of the preform. From the annular chamber 453, the cooling fluid passes into a removal conduit 432 defined outside the tubular element 430 and then exits the male mould element 402.

The cooling circuit for cooling the neck of the preform and the further cooling circuit for cooling the bottom and the side wall of the preform are independent of each other. In other words, in the male mould element 402, the cooling fluid which circulates inside the cooling circuit is not mixed with the cooling fluid which circulates inside the further cooling circuit.

Figure 13:
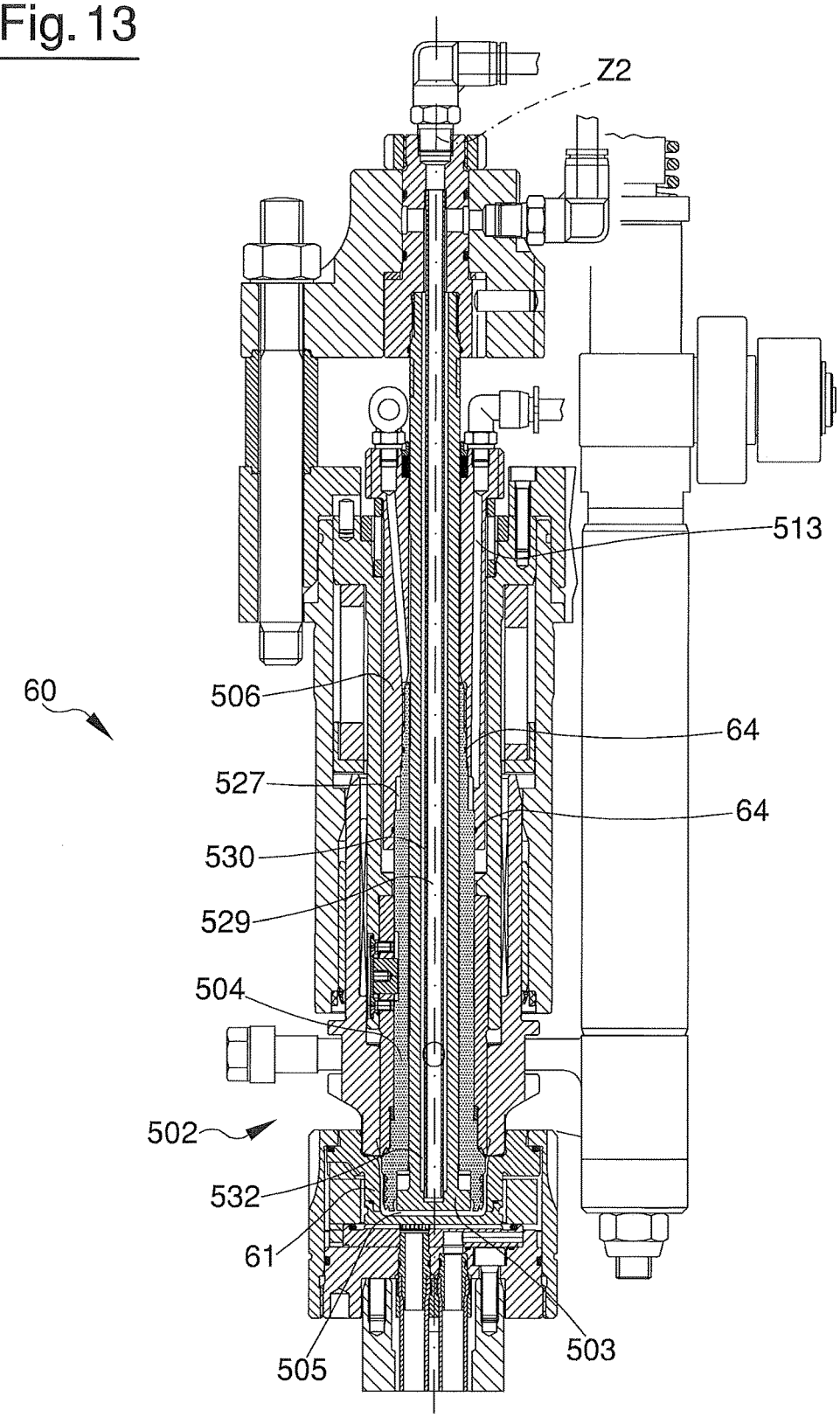
FIG. 13 is a section like the one in FIG. 1, showing one part of a moulding unit for producing caps, according to an alternative embodiment.

FIG. 13 shows a moulding unit 60 for obtaining an object 505 made of polymeric material, for example a cap of a container.

What will be described below with reference to FIG. 13 can however also be applied to moulds configured for forming objects other than caps to obtain, for example, objects such as seals, preforms or containers.

The moulding unit 60 comprises a male mould element 502, suitable for internally forming the object 505. The moulding unit 60 further comprises a female mould element 61, suitable for forming an outer surface of the object 505.

In the example shown in FIG. 13, the male mould element 502 and the female mould element 61 are configured to obtain the object 505 by compression moulding. What will be described below can however also be applied for objects obtained by injection moulding.

The male mould element 502 comprises a central forming core 503 having a forming end for internally forming a base wall of the object 505. The forming end of the central forming core 503 is moreover configured to form a part of a sealing lip that projects from the base wall of the object 505.

The central forming core 503 extends along a longitudinal axis Z2.

Figure 14:
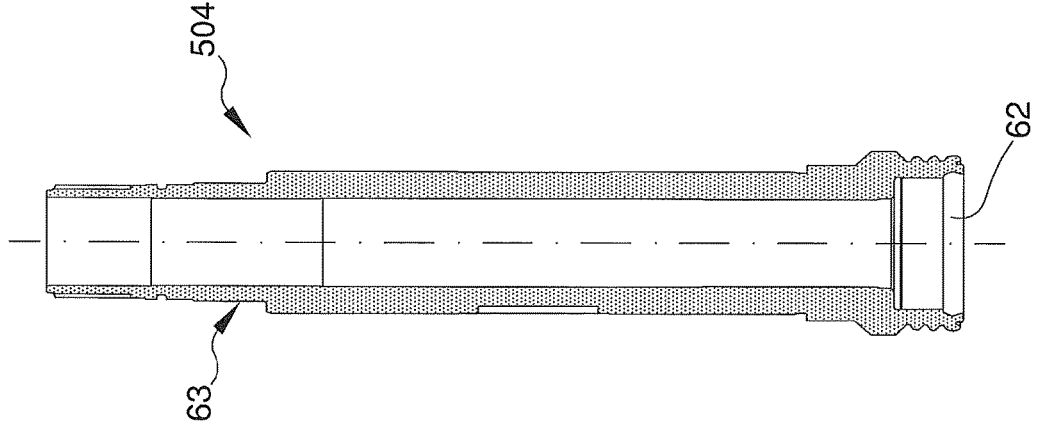
FIG. 14 is an enlarged section, showing a heat pipe of the moulding unit of FIG. 13.

The male mould element 502 further comprises a tubular forming member 504 disposed outside the central forming core 503 and shown in detail in FIG. 14. In particular, the tubular forming member 504 surrounds the central forming core 503. The tubular forming member 504 has a shaping end 62 disposed to form a portion of the sealing lip of the object 505. More in particular, the central forming core 503 forms an inner surface of the sealing lip, whereas the tubular forming member 504 forms an outer surface of said lip.

The shaping end 62 of the tubular forming member 504 is moreover disposed so as to internally form a side wall of the object 505. If the object 505 is a cap, the side wall can be provided with fastening elements, for example threads, to fasten the cap to a container to be closed.

It is understood that the shaping end 62 of the tubular forming member 504 can be configured differently from what was described above, particularly where the object 505 is not a cap.

The tubular forming member 504 is configured as a heat pipe. In particular, the tubular forming member 504—even if this is not visible in FIG. 14—is hollow on the inside and contains a liquid, which fills a part of the volume defined inside the tubular forming member 504. The operating principle of the tubular forming member 504, and more in general of the heat pipe, is based on the removal of heat from the object 505 due to a change of state of the liquid contained inside the heat pipe. As a result of the heat emitted by the polymeric material that is being moulded, said liquid passes from the liquid state into the gaseous state.

The male mould element 502 further comprises a cooling circuit for cooling the tubular forming member 504 or, more generally speaking, the heat pipe. The cooling circuit is partially fashioned inside a component 506 which supports the tubular forming member 504. The tubular forming member 504 can be mounted on the component 506 by means of a removable connection, for example by means of a threaded connection.

The component 506 can have a tubular configuration.

The tubular forming member 504 has an end region received within the component 506.

The cooling circuit comprises an inlet conduit 513 fashioned in the component 506, for example passing through the thickness of the component 506.

The inlet conduit 513 can be a longitudinal conduit, i.e. it can extend parallel to the longitudinal axis Z2.

There is further provided an unillustrated outlet conduit, likewise fashioned in the component 506. The outlet conduit, too, can be longitudinal, i.e. disposed parallel to the longitudinal axis Z2. The outlet conduit can be provided in a position diametrically opposed to that of the inlet conduit 513.

The inlet conduit 513 and the unillustrated outlet conduit communicate with an annular conduit 527, which is disposed for cooling the tubular forming member 504. The annular conduit 527 is defined between the component 506 and the tubular forming member 504.

The annular conduit 527 can extend along a line of extension configured as a line closed in a ring-like manner, lying in a plane that is transverse, in particular perpendicular, to the longitudinal axis Z2.

Two sealing rings 64 can be interposed between the component 506 and the tubular forming member 504, on opposite sides of the annular conduit 527. The sealing rings 64 prevent the cooling fluid from leaking between the component 506 and the tubular forming member 504.

The male mould element 502 further comprises a further cooling circuit suitable for cooling the central forming core 503.

The further cooling circuit can comprise an intake conduit 529 fashioned inside a tubular element 530 which extends along the longitudinal axis Z2. The tubular element 530 is disposed inside the central forming core 503.

Via the intake conduit 529, a cooling fluid circulating in the further cooling conduit can be conveyed in proximity to the forming end of the central forming core 503 so as to cool the base wall and, if necessary, the sealing lip of the object 505.

A removal conduit 532 is fashioned inside the central forming core 503 in order to remove the cooling fluid circulating in the further cooling circuit after the cooling fluid has cooled the object 505. The removal conduit 532 can be defined in a gap interposed between the tubular element 530 and the central forming core 503.

The further cooling circuit fashioned inside the central forming core 503 is independent of the cooling circuit which cools the tubular forming member 504.

The other components of the male mould element 502 are identical to those of the male mould element 2 described with reference to FIG. 1 and will not be described again in detail.

During operation, while the object 505 is being shaped between the male mould element 502 and the female mould element 61, the heat pipe with which the tubular forming member 504 is realized cools the hot polymeric material which is forming the object 505. The liquid contained inside the heat pipe is heated and passes into a gaseous state, thus removing a large amount of heat from the object 505.

A cooling fluid enters the cooling circuit associated with the tubular forming member 504 through the inlet conduit 513. The cooling fluid arrives in the annular conduit 527 and cools the tubular forming member 504, i.e. the heat pipe. In particular, the cooling fluid cools an end region 63 of the tubular forming member 504, opposite the shaping end 62.

After having cooled the tubular forming member 504, the cooling fluid exits the cooling circuit through the unillustrated outlet conduit fashioned in the component 506.

Simultaneously, a cooling fluid circulating in the further cooling circuit associated with the central forming core 503 enables the temperature of the central forming core 503 to be maintained limited.

The object 505 can thus be effectively cooled, enabling the production speed to be increased and the cycle time to be reduced.

In the example illustrated, the heat pipe defines an element, i.e. the tubular forming member 504, which is intended to come into contact with the polymeric material to form the object 505.

In an alternative embodiment, it is possible to use a heat pipe also to realize mould components other than the tubular forming member 504, which are intended to come into contact with the polymeric material. For example, one or more components of the female mould element 61 intended to come into contact with the polymeric material could be realized with a heat pipe.

It is also possible to use a heat pipe to realize mould components which need not come directly into contact with the polymeric material, in which case the heat pipe will be disposed to remove heat from a forming element that interacts with the plastic material.

For example, the tubular forming member 504 could be realized in two parts, that is, the shaping end 62 could be made as a component that is distinct from the remaining portion of the tubular forming member 504.

In this case, the shaping end 62 could be configured as a solid body, made of a material having good thermal conductivity properties. The remaining portion of the tubular forming member 504 could instead be realized with a heat pipe.

This latter solution can be successfully employed when the shaping end has a rather complicated geometry, such that it could be difficult to realize with a heat pipe.

In conclusion, a heat pipe can be used to realize mould components capable of being interposed between the object and a cooling circuit in which a cooling fluid circulates, even if not necessarily designed to come directly into contact with the polymeric material which forms the object.

Figure 15:
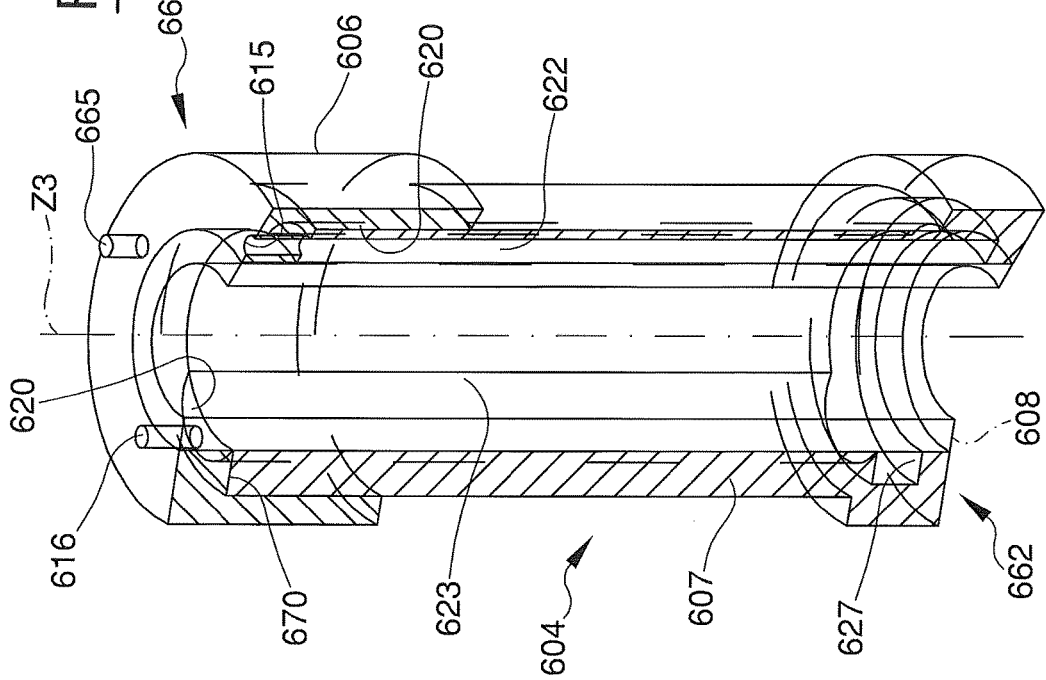
FIG. 15 is a schematic perspective view, partially cut away, showing a part of a male mould element according to an alternative embodiment.

FIG. 15 schematically shows a tubular forming member 604 of a male mould element suitable for forming objects made of polymeric material by injection or compression moulding. The objects formed by the male mould element partly illustrated in FIG. 15 can be, for example, caps for containers, seals for caps, containers or preforms for obtaining containers, particularly bottles.

The tubular forming member 604 has a longitudinal axis Z3.

The tubular forming member 604 has a forming end 662, whose shape has been schematically drawn in FIG. 15 and which is capable of interacting with the polymeric material to form the polymeric material according to a desired geometry.

The tubular forming member 604 further has a support end 663, opposite the forming end 662, capable of being fastened to an unillustrated support element of the male mould element.

The tubular forming member 604 can be realized in two parts. In particular, the tubular forming member 604 can comprise an outer component 607 and an inner component 608, shown with a dash-dot line in FIG. 15.

The outer component 607 and inner component 608 can both have a substantially tubular configuration. The inner component 608 is disposed inside the outer component 607, coaxially relative to the outer component 607.

The inner component 608 and the outer component 607 can be connected to each other owing to a removable, i.e. non-permanent, connection.

The tubular forming member 604 is provided with a cooling circuit through which a cooling fluid can circulate in the tubular forming member 604, so as to cool the forming end 662.

The cooling circuit can comprise an annular conduit 627 fashioned in the forming end of the annular forming member 604. The annular conduit 627 can be defined between the outer component 607 and the inner component 608. For example, the annular conduit 627 could be defined by a groove fashioned in the outer component 607, radially closed by the inner component 608, which could have a smooth outer surface. It is also possible for the annular conduit 627 to be defined by a groove fashioned in the inner component 608, or by two facing grooves fashioned respectively in the inner component 608 and in the outer component 607.

The annular conduit 627 extends along a line of extension that is closed in a ring-like manner around the longitudinal axis Z3. The line of extension thereof can lie in a plane that is transverse to the longitudinal axis, in particular perpendicular to the longitudinal axis. The line of extension can be circular.

An inlet passage 622 communicates with the annular conduit 627, for example leading into the annular conduit 627. The inlet passage 622 is defined between the outer component 607 and the inner component 608.

The inlet passage 622 enables the cooling fluid entering the male mould element to reach the annular conduit 627.

The inlet passage 622 extends longitudinally in the tubular forming member 604. In particular, the inlet passage 622 can be parallel to the longitudinal axis Z3.

The cooling circuit further comprises an outlet passage 623 communicating with the annular conduit 627 in order to convey the cooling fluid circulating in the annular conduit 627 toward the support end 663. In particular, the outlet passage 623 is defined between the outer component 607 and the inner component 608.

The outlet passage 623 enables the cooling fluid to leave the male mould element after being passed through the annular conduit 627.

The outlet passage 623 likewise extends longitudinally in the tubular forming member 604. In particular, the outlet passage 623 can be parallel to the longitudinal axis Z3.

In the example shown in FIG. 15, the inlet passage 622 and the outlet passage 623 are defined by respective longitudinal channels 620 fashioned on an inner surface of the outer component 607. The channels 620 are radially closed off by a cylindrical outer surface of the inner component 608.

Alternatively, the inlet passage 622 and/or the outlet passage 623 could be defined by respective longitudinal channels fashioned on an outer surface of the inner component 608, radially closed off by a cylindrical inner surface of the outer component 607.

It is also possible that both on the inner component 608 and on the outer component 607 there might be defined respective longitudinal channels which, when they are facing each other, define the inlet passage 622 and/or the outlet passage 623.

In any case, the inlet passage 622 and the outlet passage 623 can each have an angular dimension of at least 10°, particularly at least 30°, around the longitudinal axis Z3. In this manner, the inlet passage 622 and the outlet passage 623 will assure a high flow of cooling fluid, such as to effectively cool the forming end 662. The inlet passage 622 and the outlet passage 623 can be disposed in diametrically opposed positions.

In an alternative embodiment, the cooling circuit can comprise a plurality of inlet passages 622, distributed around the longitudinal axis Z3 so as to convey the cooling fluid toward the annular conduit 627.

The cooling circuit can also comprise a plurality of outlet passages 623, distributed around the longitudinal axis Z3 so as to remove the cooling fluid from the annular conduit 627.

In this case, the sum of the angular dimensions of the inlet passages 622 around the longitudinal axis Z3 can be equal to at least 10°, particularly greater than 30°. The same applies for the sum of the angular dimensions of the outlet passages 623.

The tubular forming member 604 further comprises a connection component 606 disposed on the support end 663 so as to feed the cooling fluid into the cooling circuit fashioned in the tubular forming member 604, and discharge the cooling fluid from said circuit.

For this purpose, the connection component 606 can be provided with an inlet 615, shaped for example like an inlet hole, to convey the cooling fluid coming from an unillustrated source toward the inlet passage 622.

The connection component 606 can further be provided with an outlet 616, shaped for example like an outlet hole, to remove the cooling fluid coming from the outlet passage 623.

The inlet 615 and outlet 616 can be longitudinal, i.e. disposed parallel to the longitudinal axis Z3, for example in respective diametrically opposed positions relative to the longitudinal axis Z3.

The inlet 615 and outlet 616 respectively face the inlet passage 622 and outlet passage 623 along an interface zone 670, which can be configured as a flat interface that is disposed transversely, in particular perpendicularly, to the longitudinal axis Z3.

In the interface zone 670, the outer component 607 is in contact with the connection component 606.

The angular dimensions of the inlet passage 622 and the outlet passage 623 around the longitudinal axis Z3, measured in the interface zone 670, are greater than the corresponding angular extents of the inlet 615 and the outlet 616, respectively. In this manner, it is possible to define a plurality of angular positions of the outer component 607 relative to the connection component 606 in which the inlet 615 will be in fluid communication with the inlet passage 622 and the outlet 616 will be in fluid communication with the outlet passage 623.

The inlet 615 and the outlet 616 thus define first passage elements, whereas the inlet passage 622 and the outlet passage 623 define second passage elements, the first passage elements being in fluid communication with (in particular facing) the second passage elements in a plurality of angular positions of the outer component 607 relative to the connection component 606.

The connection component 606 can be provided with a reference element 665, for example shaped liked a pin, capable of engaging a hole of the support element to assure that the connection component 606 is mounted in a predetermined angular position relative to the support element.

The male mould element can further comprise a central forming core, disposed inside the tubular forming member 604 so as to form a portion of the object which it is desired to obtain, particularly a base wall of said object. If the male mould element is configured to form a cap or seal, the central forming core can have a structure analogous to the central forming core 3 shown in FIGS. 1 and 2.

In the central forming core a further cooling circuit can be fashioned, in which circuit a cooling fluid will circulate to cool the portion of the object formed by the central forming core.

The further cooling circuit fashioned in the central forming core is independent of the cooling circuit fashioned in the tubular forming member 604. In other words, the cooling fluids that circulate in the two circuits are not mixed together inside the male mould element.

The aforesaid cooling circuit and further cooling circuit enable effective cooling of the central forming core and the tubular forming member 604, particularly if the central forming core and the tubular forming member 604 can move relative to each other, for example to remove a portion of the formed object provided with undercuts from the male mould element.

Generally speaking, the shape and dimensions of the delivery recess, return recess, channels, inlet passage and outlet passage, as well as the number thereof, can be chosen freely, provided that a sufficient flow of cooling fluid is assured. For example, channels, recesses or passages having a partially circular cross section are very simple to obtain by machining with machine tools, but it is also possible to adopt shapes other than a partially circular one. Moreover, the flow of cooling fluid being equal, it is possible to decrease the angular extent of recesses, channels or passages and increase the depth thereof. This applies for all of the illustrated embodiments.

The invention claimed is:

1. A male mould element comprising a cooling circuit having first passage elements obtained in a first component of the male mould element and second passage elements obtained in a second component of the male mould element, the first passage elements and the second passage elements being distributed around a longitudinal axis of the male mould element so that there exists a plurality of angular positions of the first component relative to the second component in which the first passage elements are in fluid communication with the second passage elements, wherein the second component is removably fixed to the first component by means of a non-permanent connection so that the first and second components are configured to be repeatedly disassembled from each other for cleaning or maintenance operations and then reassembled, and so that the second component is mounted so as to be non-rotatable relative to the first component during operation of the male mould element, wherein the first passage elements comprise at least one first longitudinal passage and the second passage elements comprise at least one second longitudinal passage, the at least one first longitudinal passage having an angular dimension around the longitudinal axis that is greater than an angular dimension of the at least one second longitudinal passage around the longitudinal axis, so that said at least one second longitudinal passage faces said at least one first longitudinal passage for the whole angular dimension of the at least one second longitudinal passage around the longitudinal axis in said plurality of angular positions.

2. A male mould element according to claim 1, wherein the non-permanent connection is a threaded connection.

3. A male mould element according to claim 1, wherein the second component has a fastening end which is removably fixed to the first component and a further end opposite the fastening end, the second passage elements extending from the fastening end toward the further end and facing the first passage elements in an interface zone between the first component and the second component.

4. A male mould element according to claim 3, wherein, in the interface zone, the fastening end of the second component is inserted inside the first component, so that the second component is inside the first component for a portion of the length of the second component and protrudes from the first component for the remaining portion of the length of the second component.

5. A male mould element according to claim 3, wherein the interface zone is shaped as a plane arranged transversely to the longitudinal axis, so that in the interface zone the first passage elements frontally communicate with the second passage elements.

6. A male mould element according to claim 3, wherein the further end of the second component is a forming end for forming a portion of an object.

7. A male mould element according to claim 1, wherein the first passage elements comprise a delivery recess and a return recess, the second passage elements comprising a plurality of channels distributed around the longitudinal axis.

8. A male mould element according to claim 7, wherein the delivery recess and the return recess are obtained in the first component at the same height along the longitudinal axis.

9. A male mould element according to claim 7, wherein the delivery recess and the return recess are arranged in diametrically opposed positions relative to the longitudinal axis.

10. A male mould element according to claim 7, wherein a pair of separating surfaces are interposed between the delivery recess and the return recess, each separating surface being in contact with a surface portion of the second component so as to isolate the delivery recess from the return recess.

11. A male mould element according to claim 10, wherein at least one channel of said plurality of channels faces the delivery recess, at least one channel of said plurality of channels faces the return recess, and at least one channel of said plurality of channels faces each separating surface.

12. A male mould element according to claim 7, wherein the delivery recess and the return recess are obtained on an inner surface of the first component, the channels of said plurality of channels being obtained on an outer surface of the second component.

13. A male mould element according to claim 1, and further comprising a tubular forming member provided with a forming surface for forming a portion of an object, the first component and the second component being included in the tubular forming member, said forming surface being obtained on the second component.

14. A male mould element according to claim 13, wherein the tubular forming member comprises a third component that is coaxial with the second component.

15. A male mould element according to claim 14, wherein the first passage elements comprise a delivery recess and a return recess, the second passage elements comprising a plurality of channels distributed around the longitudinal axis, and wherein the channels of said plurality of channels continue along a region of the second component which projects from the first component, a lateral face of the third component facing the channels in said region, so as to close said channels and define corresponding conduits.

16. A male mould element according to claim 13, wherein the first passage elements comprise a delivery recess and a return recess, the second passage elements comprising a plurality of channels distributed around the longitudinal axis, and wherein the cooling circuit comprises a communication conduit shaped as an annular conduit, communicating with both the delivery recess and the return recess through the channels of said plurality, the communication conduit being arranged near said forming surface.

17. A male mould element according to claim 16, wherein the tubular forming member comprises a third component that is coaxial with the second component, and wherein the communication conduit is defined between the second component and the third component.

18. A male mould element according to claim 13, and further comprising a central forming core arranged inside the tubular forming member for forming a further portion of said object, a further cooling circuit being provided for cooling the central forming core, said further cooling circuit being independent of said cooling circuit.

19. A male mould element according to claim 18, and further comprising a movement device for causing a relative movement between the central forming core and the tubular forming member, such as to disengage an undercut portion formed between the central forming core and the tubular forming member.

20. A male mould element according to claim 1, wherein the first passage elements are in fluid communication with the second passage elements regardless of the angular position of the first component relative to the second component.

21. A male mould element according to claim 1, wherein the first component and the second component are assembled together without interposition of a timing system having the purpose of positioning the second component in a predetermined angular position relative to the first component.

* * * * *